United States Patent
Rokhlin (10) Patent No.: US 10,612,232 B1
(45) Date of Patent: Apr. 7, 2020

(54) MODULAR SELF-SUPPORTING ARCHED CEILING STRUCTURE

(71) Applicant: Zinoviy Rokhlin, Brooklyn, NY (US)

(72) Inventor: Zinoviy Rokhlin, Brooklyn, NY (US)

( * ) Notice: Subject to any disclaimer, the term of this patent is extended or adjusted under 35 U.S.C. 154(b) by 0 days.

(21) Appl. No.: 16/501,172

(22) Filed: Mar. 2, 2019

(51) Int. Cl.
  *E04B 1/32* (2006.01)
  *E04G 11/40* (2006.01)
  *E04B 1/14* (2006.01)

(52) U.S. Cl.
  CPC ............. *E04B 1/3205* (2013.01); *E04B 1/32* (2013.01); *E04G 11/40* (2013.01); *E04B 1/14* (2013.01); *E04B 2001/3217* (2013.01); *E04B 2001/3288* (2013.01)

(58) Field of Classification Search
  CPC .......... E04B 1/3205; E04B 2001/3217; E04B 2001/3276; E04B 1/32; E04B 2001/3252; E04B 2001/3288; E04B 2001/3583; E04B 1/14; E04B 2001/3264; E04B 2001/327
  USPC ................................ 52/86, 745.07
  See application file for complete search history.

(56) References Cited

U.S. PATENT DOCUMENTS

| | | | | |
|---|---|---|---|---|
| 3,968,604 A * | 7/1976 | Hills | ..................... | E04B 1/3205 52/86 |
| 4,569,166 A * | 2/1986 | Buchmuller | ......... | A01G 9/1469 52/86 |
| 4,573,300 A * | 3/1986 | Bezner | ..................... | E04C 2/543 428/100 |
| 6,161,342 A * | 12/2000 | Barbier | .................... | E02D 29/05 405/124 |
| D533,950 S * | 12/2006 | Givoni | ......................... | D25/138 |
| 7,281,353 B2 * | 10/2007 | Konstantin | ............... | A01G 9/22 49/82.1 |
| 8,205,385 B2 * | 6/2012 | Konstantin | ............... | A01G 9/22 49/82.1 |
| 8,650,827 B2 * | 2/2014 | Givoni | .................... | E04C 2/543 52/459 |
| 2012/0073428 A1* | 3/2012 | Milinkovic | ............. | B28B 1/087 89/36.04 |
| 2014/0096455 A1* | 4/2014 | Rogula | ..................... | E04B 1/32 52/80.1 |
| 2014/0290153 A1* | 10/2014 | Christensen | .......... | E04B 1/3205 52/86 |

FOREIGN PATENT DOCUMENTS

| | | | | |
|---|---|---|---|---|
| CA | 2568610 A1 * | 5/2008 | ........... | E04B 1/3205 |
| FR | 2198514 A5 * | 3/1974 | ........... | A01G 9/1438 |
| GB | 941466 A * | 11/1963 | ......... | A01G 13/0231 |

* cited by examiner

*Primary Examiner* — Ryan D Kwiecinski
*Assistant Examiner* — Matthew J Gitlin (57) ABSTRACT

A modular self-supporting arched ceiling structure has a plurality of interconnected modules each extending in a first direction over an arc and arranged one after the other in a second direction which is transverse to the first direction, with each of the modules being composed of a plurality of interconnected panels located adjacent to one another in a direction of elongation of each of the modules, and each of the panels has two plates spaced from each other to form therebetween a space which is filled with a cellular material with one of the plates composed of a plurality of strips of a heavy-duty high-modulus material.

10 Claims, 7 Drawing Sheets

MODULAR SELF-SUPPORTING ARCHED CEILING STRUCTURE

BACKGROUND OF THE INVENTION

The present invention relates to ceiling structures, in particular to structures which form ceilings in corresponding spaces.

Ceiling structures are known in constructions and used, by their definition, to form ceilings in corresponding spaces. They are usually composed of supporting metal structures covered with panels and have unsatisfactory ratios of their strength to their weight. Various panels for them are known in the art, including a panel disclosed in U.S. Pat. No. 5,471,806 by the inventor of the invention disclosed in the current patent application. It is believed that the known ceiling structures can be further improved.

SUMMARY OF THE INVENTION

Accordingly, it is an object of the present invention to provide a new ceiling structure which represent a further improvement of existing ceiling structures for corresponding spaces.

In keeping with these objects and with others which will become apparent hereinafter one feature of the present invention resides, briefly stated, in a modular self-supporting arched ceiling structure, which has a plurality of modules each extending in a first longitudinal direction over an arc and arranged adjacent to one another in a second direction which is transverse to the first direction, and each of the modules is composed of a plurality of panels located adjacent to one another in the first direction with wedge-shaped gaps provided between neighboring ones of the panels and filled with a binder.

The modular self-supporting arched ceiling structure further has first connecting means for connecting the modules with each other and including two first end profiles receiving two opposite ends of the ceiling structure as considered in the first longitudinal direction, and longitudinal ties extending between the modules in the first longitudinal direction and connecting the first end profiles with one another.

The modular self-supporting arched ceiling structure further has second connecting means for connecting the modules with each other and including two second end profiles receiving two opposite ends of the ceiling structure as considered in the second transverse direction, and transverse ties extending through the modules and between the panels and connecting the second end profiles with one another.

Each of the first end profiles of the first connecting means of the modular self-supporting arched ceiling structure has a receptacle for receiving one of the opposite ends of the ceiling structure and also a portion connectable to a carrier structure.

In addition to the first and second connecting means, a plurality of ties are provided and each connecting one end of one panel with an opposite end of a neighboring panel at each transverse side of the modular self-supporting arched ceiling structure.

Each of the panels of the modular self-supporting arched ceiling structure can include two plates which are spaced from each other to form therebetween a space which is filled with a cellular material.

The two plates of each of the panels include a lower plate composed of a plurality of strips of a heavy-duty high-modulus material. The two plates of each of the panels can be transparent. One of the two plates of each of the panels can be provided with a photoelectric coating.

Each of the panels can also be constructed for converting solar energy into electric current and is provided with an inverter for inverting a direct current into an alternating current and with an accumulator.

The modular self-supporting arched ceiling structure constructed in accordance with the present invention has a very high strength and a low weight with a high strength/weight ratio. It has very high heat insulating and noise insulating properties, has a low material consumption, and can be installed in a significantly shorter time that the known existing arched ceiling structures. It can also operate as a source of three-phase current of high power.

The novel features of the present invention are set forth in particular in the appended claims.

The invention itself, however, will be best understood from the following description of the preferred embodiments which is accompanied by the following drawings.

DESCRIPTION OF THE PREFERRED EMBODIMENTS

Figure 1:
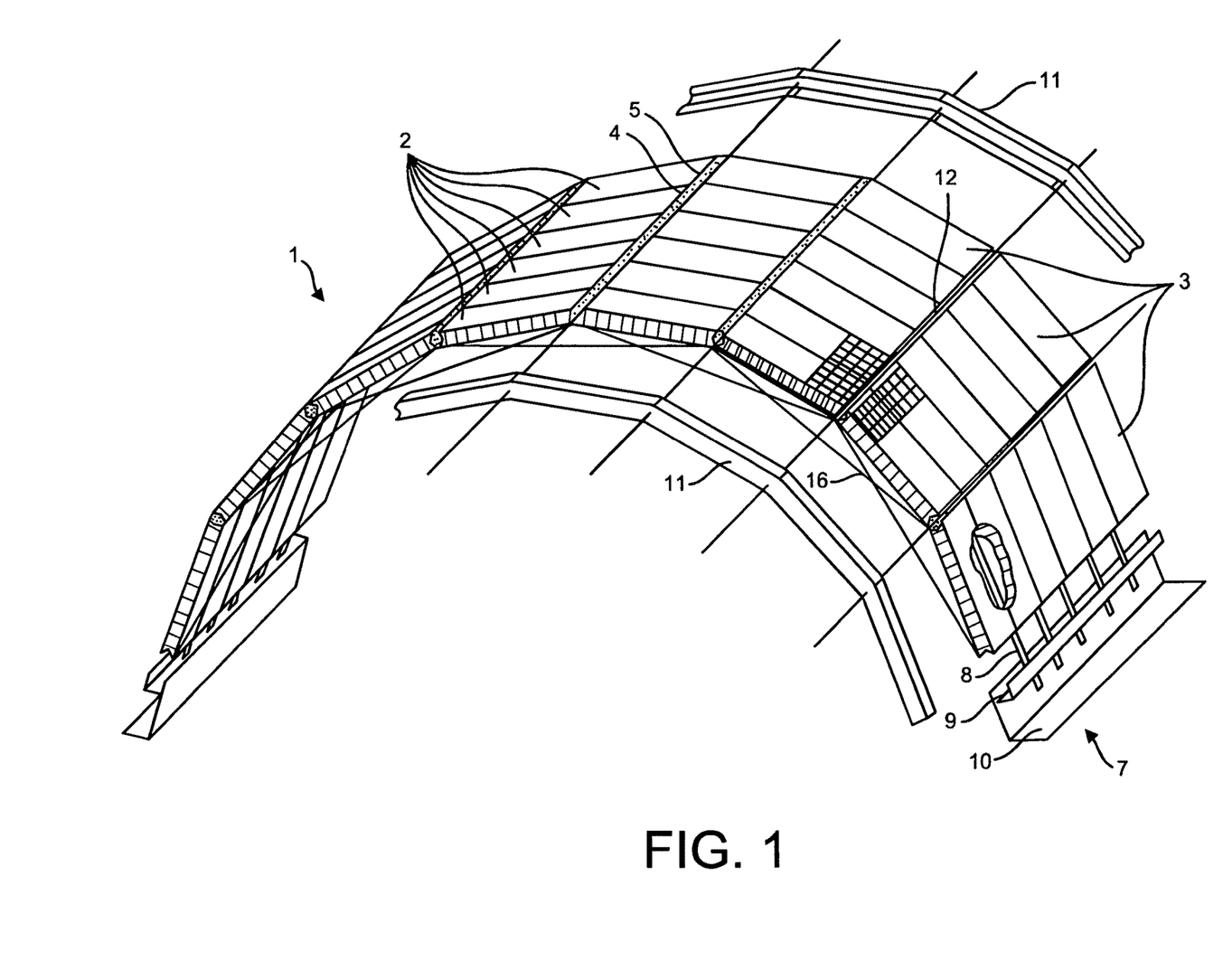
FIG. 1 of the drawings is a view showing a modular self-supporting arched ceiling structure according to the present invention.

A modular self-supporting arched ceiling according to the present invention is identified as a whole with reference numeral 1. It has a plurality of modules 2 each extending in a first longitudinal direction over an arc. The modules 2 are arranged adjacent to one another in a second direction, which is transverse to the first direction. Each of the modules 2 is composed of a plurality of panels 3 located adjacent to one another in the first longitudinal direction. The panels 3 are formed with wedge-shaped gaps 4 provided between the neighboring panels as considered in the longitudinal directions and filled with a binder 5 of any known adhesive composition, with hydraulically insulating covering pieces 6 at both sides of each gap 4.

Figure 2:
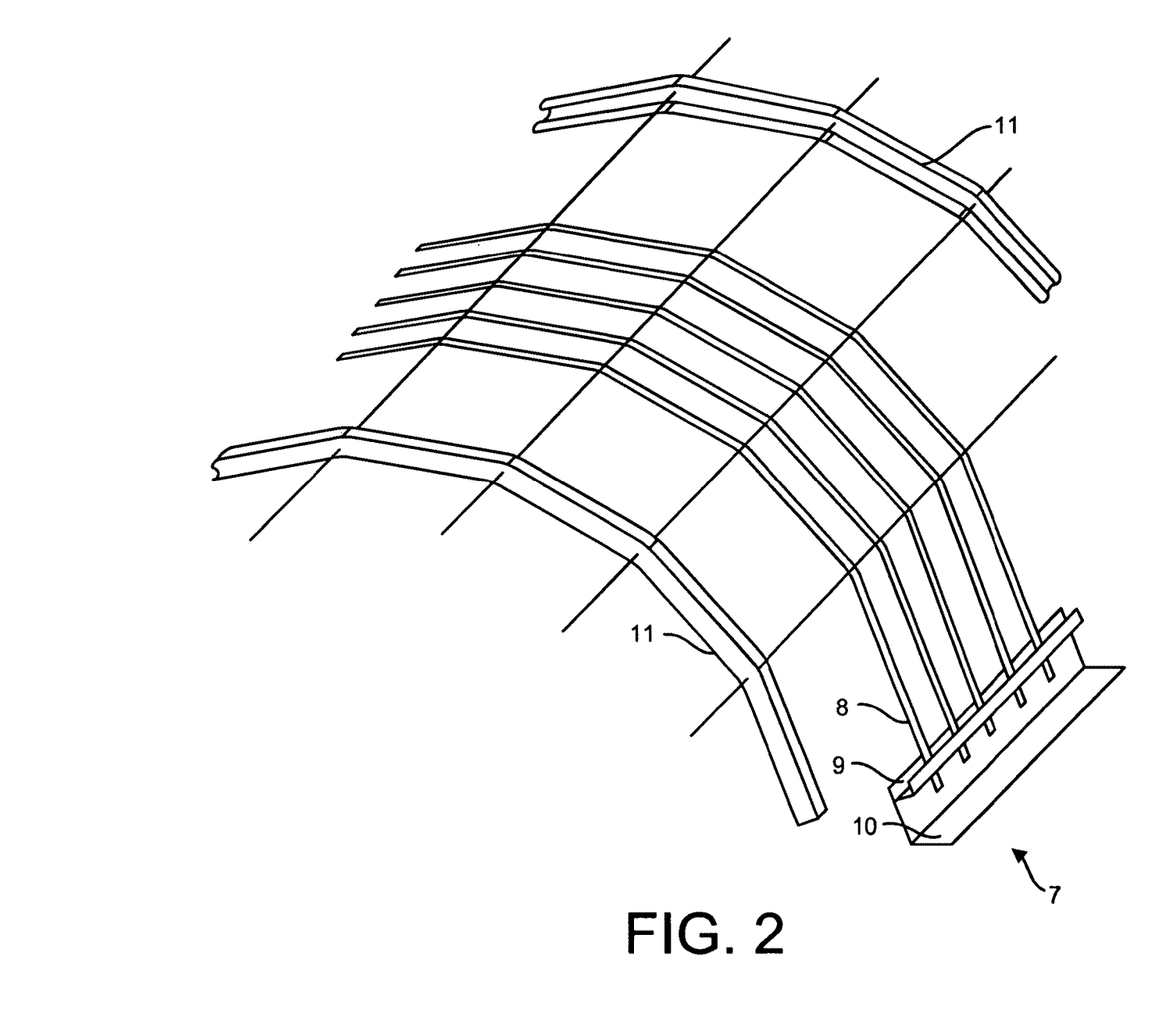
FIG. 2 of the drawings is a view showing connecting means used for assembly of the modular self-supporting arched ceiling structure according to the present invention.

The modular self-supporting arched ceiling structure has first connecting means which connect the modules 2 with each other in a longitudinal direction. The first connecting means include two first end profiles 7 which receive two opposite ends of the ceiling structure as considered in the longitudinal direction, and longitudinal ties 8 which extend between the modules 2 in the gaps 4 in the longitudinal direction and connect the end profiles 7 with one another. Each of the end profiles 7 has a receptacle 9 for receiving one of the opposite ends of the ceiling structure and a portion 10 connectable to a support for example by screws.

The modular self-supporting arched ceiling structure further has second connecting means which connect the modules 2 with each other in a transverse direction. The second connecting means include two second end profiles 11 which receive two opposite ends of the ceiling structure as considered in the second transverse direction, and transverse ties 12 which extend through the modules 2 and between the panels 3 in wedge-shaped gaps 13 filled with a binder 14 of a known adhesive composition, with hydraulically insulating pieces 15 and connect the second end profiles 11 with one another.

The longitudinal ties 8 and the transverse ties 12 of the modular self-supporting arched ceiling structure can have threaded opposite ends extending through the end profiles 7 and 11, with nuts screwed on their threaded ends at opposite sides of the profiles.

Figure 3A:
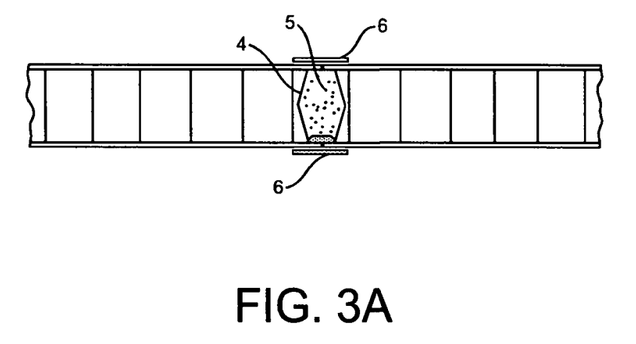
FIGS. 3a and 3b of the drawings are views showing connecting area between components of the modular self-supporting arched ceiling structure according to the present invention.
Figure 3B:
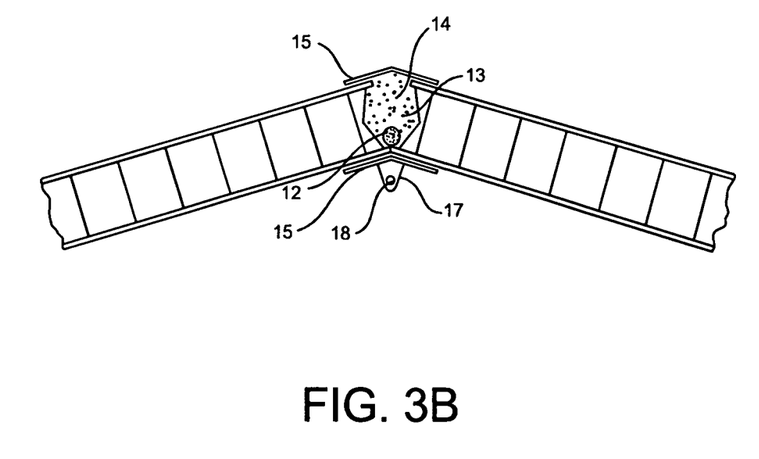

The modular self-supporting arched ceiling structure also has further connecting means. They are formed by a plurality of ties 16, each of which connect one end of one panel 3 with an opposite end of a neighboring panel 3 at each transverse side of the ceiling structure, with the use of pieces 17 provided with holes 18.

The panels 3 of the modular self-supporting arched ceiling structure can be formed according to several embodiments. All panels include two plates 19 and 20 which are spaced from each other to form therebetween a space which is filled with a cellular material 21. In the panel 3' shown in FIG. 4 the lower plate 19 is provided with high strength strips. The upper plate 20 is covered with a layer of hydraulically insulating coating 21. It is also provided with a photoelectric coating 22.

Figure 5:
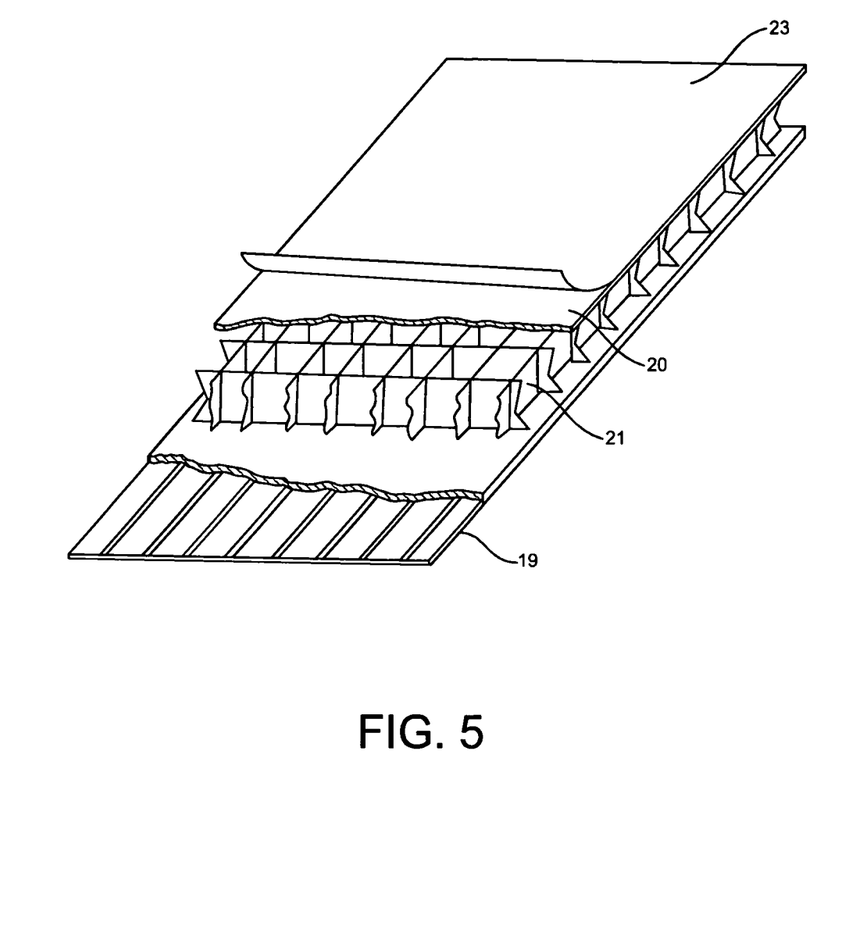
FIG. 5 of the drawings is a view showing an inert panel of the modular self-supporting arched ceiling structure according to the present invention.

The panel 3" shown in FIG. 5 also has two plates 19 and 20 which are spaced from each other to form therebetween a space filled with a cellular material 21. In this panel the lower plate 19 is also provided with high strength strips and the upper plate 20 is covered with a layer of hydraulically insulating coating 23s.

Figure 6:
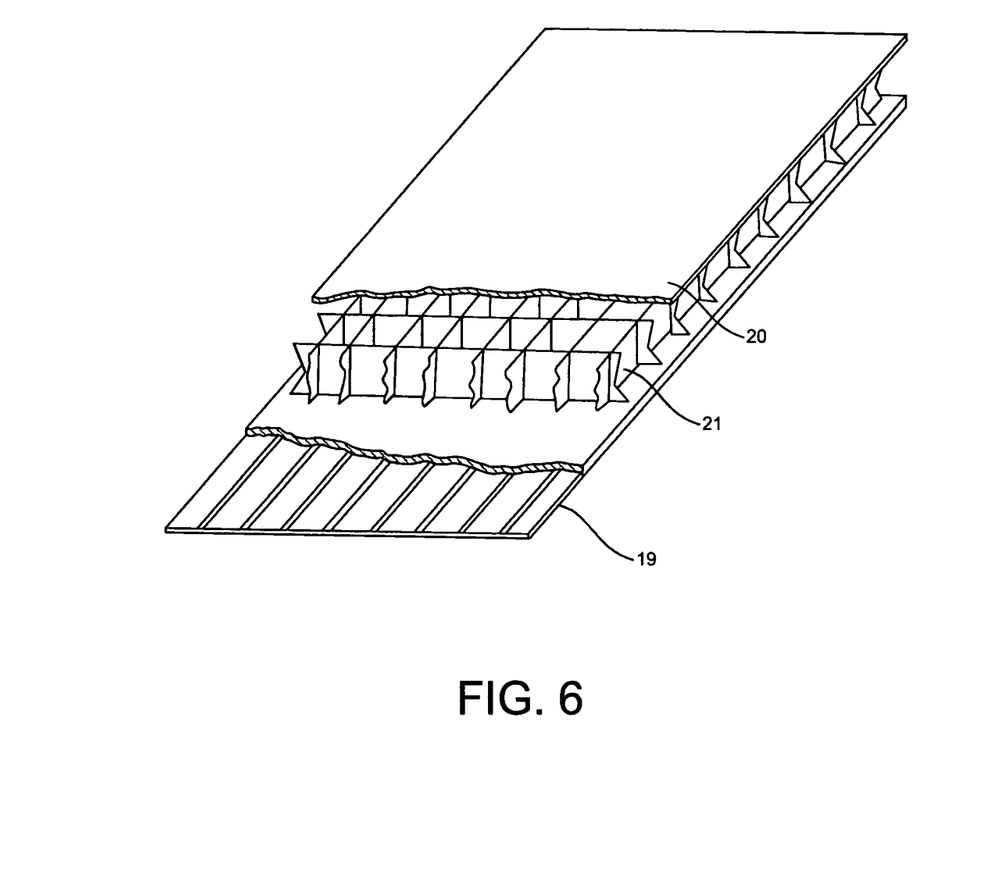
FIG. 6 of the drawings is a view showing a transparent panel of the modular self-supporting arched ceiling structure according to the present invention.

The panel 3''' shown in FIG. 6 also has two plates 19 and 20 which are spaced from each other to form therebetween a space which is filled with a cellular material 21. In this panel the lower plate 19 is also provided with high strength strips. Both plates 19 and 20 are transparent.

Figure 4:
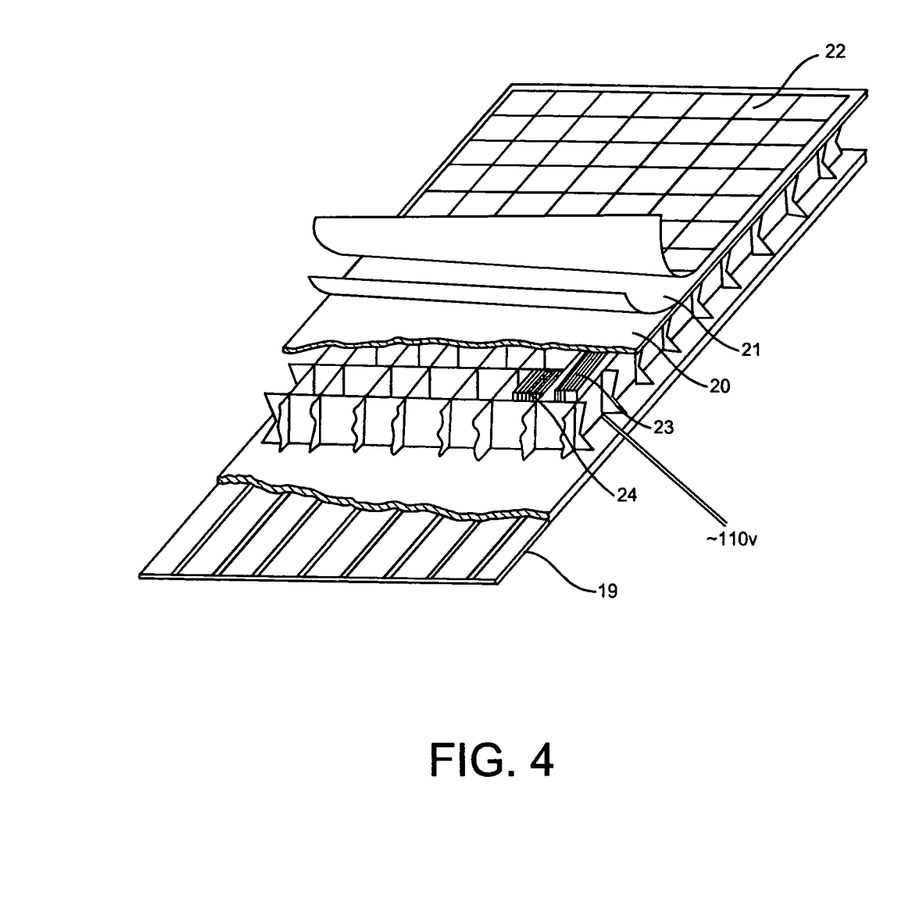
FIG. 4 of the drawings is a view showing a photo-electric panel of the modular self-supporting arched ceiling structure according to the present invention.

Each panel shown in FIG. 4 has an inverter 23 which inverts a direct current generated by a photo-electric effect produced by cells of the photoelectric coating 17 into an alternating current of 110V. It also has a lithium ion accumulator 24 connected parallel with the inverter 23.

Figure 7:
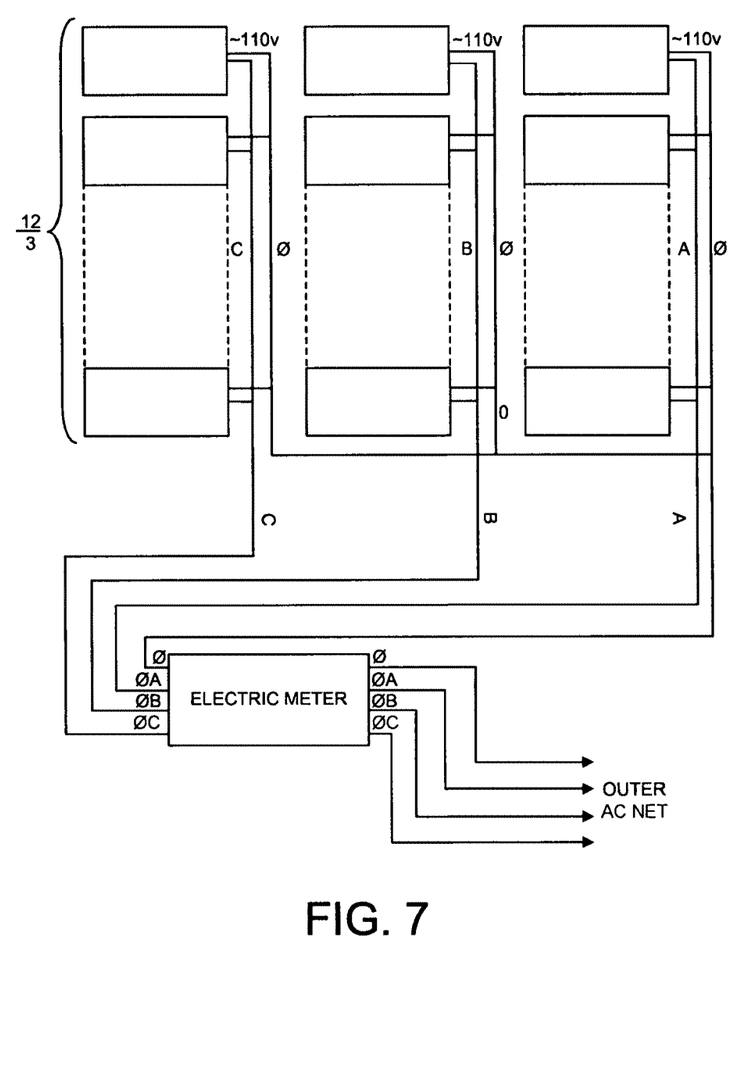
FIG. 7 of the drawings is a view showing an electrical circuit provided in the modular self-supporting arched ceiling structure with photo-electric panels for generating electricity according to the present invention.

As shown in FIG. 7 two electric wires extend out of each panel and have a voltage of the alternating current 110V. Within each module 2 the wires of the panels 3 are connected parallel, and thusly formed two wires extend through the wedge-shaped gap between two modules through an opening in a ceiling structure support into the latter. A common zero is formed via one wire from each module. The rest of the wires, each wire from each module, are connected and form phases A, B and C, and then through a coordinating device thus forming an electric circuit connected with an exterior electric circuit to supply electricity to a consumer.

While it is possible that in the modular self-supporting ceiling structure of the invention the panels of only one type from the embodiments shown in FIGS. 4-6 are used, it is also possible that are of the ceiling structure is provided with the transparent panels to form transparent openings, while another area is provided with non-transparent panels.

The modular self-supporting ceiling structure of the invention is a complex mechanical system which can be composed of three types of panels disclosed hereinabove. Each panel is subjected to bending forces during the operation and for this reason the lower plate of each panel is provided with the high-strength strips. All panels together are finished in itself fragments of ceilings or roofs and are joined with each other with strong connecting elements or ties, composed for example of Kevlar. On a ground the arched modules are assembled from the panels, and then can be placed for example on a roof and fixed in the above-described profiled elements. The arched modules are then connected with each other by transverse ties, composed for example of Kevlar. Further connecting ties connect inside the module a beginning of one panel with an end of a neighboring panel. The ties placed during mounting between the modules in profiled receptacle provide a strength of the structure. Since every panel has a wedge-shaped opening a through-going wedge-shaped channel is formed in an area of connection of panels in which the connecting ties can be easily placed and which then are filled with a binder such as a construction foam or concrete and then covered by an adhesive insulating band. All electrical conductive element are placed in gaps between the panels and exit through openings in a base.

The invention claimed is:

1. A modular self-supporting arched ceiling structure, comprising a plurality of modules each extending in a first longitudinal direction over an arc and arranged adjacent to one another in a second direction which is transverse to said first direction, wherein each of said modules being composed of a plurality of panels located adjacent to one another in the first direction, each of the plurality of panels having a wedge-shaped opening in an end facing an adjacent one of said plurality of panels, two of said wedge-shaped openings from said adjacent panels facing each other to form a channel, said channel filled with a binder; first connecting means for connecting the modules with each other and including two first end profiles receiving two opposite ends of the ceiling structure as considered in said first longitudinal direction; longitudinal ties extending between the modules in the first longitudinal direction and connecting said first end profiles with one another; second connecting means for connecting the modules with each other and including two second end profiles receiving two opposite ends of the ceiling structure as considered in the second transverse direction; transverse ties extending through the modules and between the panels and connecting the second end profiles with one another; and a plurality of further ties provided at each of two transverse sides of the ceiling structure, extending substantially in the longitudinal direction and each interconnecting one end of one panel with an opposite end of an immediately neighboring panel as considered in the longitudinal direction.

2. The modular self-supporting arched ceiling structure of claim 1, wherein each of said first end profiles of the first connecting means has a receptacle for receiving one of the opposite ends of the ceiling structure and a portion connectable to a carrier structure.

3. The modular self-supporting arched ceiling structure of claim 1, wherein each of the panels includes two plates which are spaced from each other to form therebetween a space.

4. The modular self-supporting arched ceiling structure of claim 3, wherein the two plates of each of the panels include a lower plate composed of a plurality of strips.

5. The modular self-supporting arched ceiling structure of claim 3, wherein the two plates of each of the panels are transparent.

6. The modular self-supporting arched ceiling structure of claim 3, wherein one of the two plates of each of the panels has a photoelectric coating.

7. The modular self-supporting arched ceiling structure of claim 3, wherein the space between the two plates is filled with a cellular material.

8. The modular self-supporting arched ceiling structure of claim 1, wherein each of the panels is constructed for converting solar energy into electric current and is provided with an inverter for inverting a direct current into an alternating current.

9. The modular self-supporting arched ceiling structure of claim 1, wherein one area of the arched ceiling structure is provided with one type of panels which are transparent, while another area of the arched ceiling structure is provided with another type of the panels which are not transparent.

10. The modular self-supporting arched ceiling structure of claim 1, wherein each two neighboring ones of the further neighboring ties at each of the two transverse sides intersect each other as considered in the longitudinal direction.

* * * * *